June 24, 1958     E. H. BARD     2,840,384
CART WITH ADJUSTABLE HANDLE
Filed Jan. 23, 1956
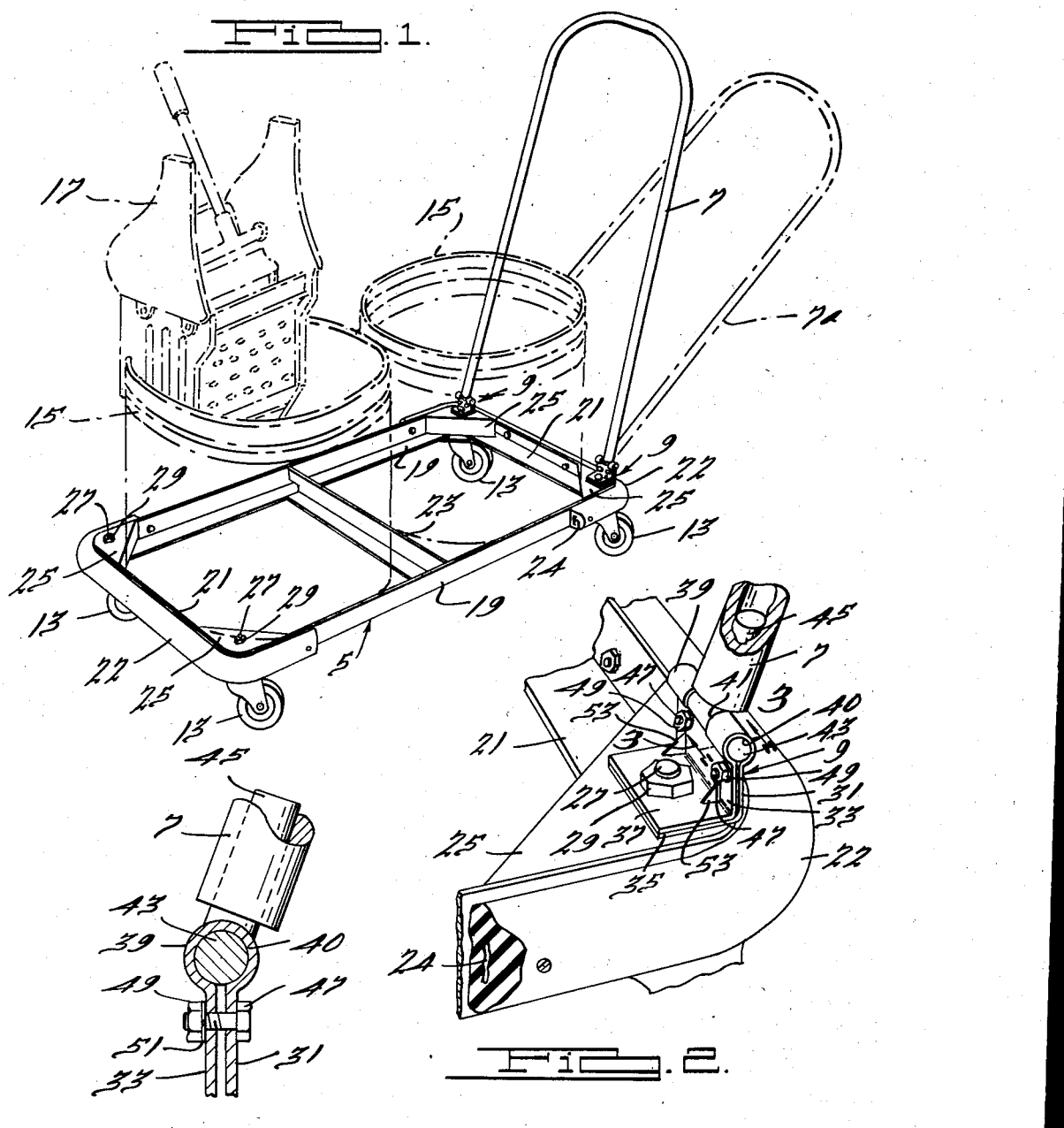
INVENTOR.
Elmer H. Bard.
BY
Harness, Dickey & Pierce
ATTORNEYS.

2,840,384

CART WITH ADJUSTABLE HANDLE

Elmer H. Bard, Muskegon, Mich., assignor to Geerpres Wringer Inc., Muskegon, Mich., a corporation of Michigan Application January 23, 1956, Serial No. 560,804

2 Claims. (Cl. 280—47.37)

This invention relates to small hand trucks generally, and more particularly to small hand trucks for handling floor cleaning equipment.

In the floor cleaning equipment supply industry there exists a need for a compact hand truck of economical construction for conveniently and safely transporting cumbersome mopping buckets, mop-wringers and the like through narrow corridors, doorways and other difficulty accessible places.

It is an object of the invention to provide a small compact hand truck having improved means including the combination of an adjustable position tubular handle and swivel caster units whereby to enable transporting of cumbersome mopping equipment with safety and ease. Other objects of the invention are to provide in association with the chassis, an adjustable position tubular handle which will remain in settable positions, thereby reducing the likelihood of accidents; to provide improved means for pivotally mounting the tubular handle on the chassis so that the same will fold flat against the chassis for storage and whereby the frictional engagement on the handle is adjustable; to provide a small hand truck which is simple and economical of construction, safe and convenient to operate, and which subserves varied and extensive conveniences.

The above and other objects of the invention will be apparent during the following description, reference being had to the accompanying drawing wherein a preferred embodiment of one form of the invention is clearly shown.

In the drawings:

Figure 1 is a perspective view of the hand truck embodying the present invention with the tubular handle shown in one of its settable positions in outline, and also showing in outline illustrative floor cleaning equipment adapted and intended to be transported by the said truck;

Fig. 2 is an enlarged fragmentary view of certain parts of the structure of Fig. 1; and Fig. 3 is an enlarged vertical section substantially on the line 3—3 of Fig. 2.

The hand truck generally comprises a chassis 5 on which is pivotally mounted a tubular handle 7 by a pair of adjustable friction hinges generally designated 9. Caster units 13 support the chassis 5 on the floor and provide for rolling the same. The chassis 5 is adapted and intended to carry mopping equipment and typical thereof are shown in outline a pair of mopping buckets 15 and a mop-wringer 17 mounted on one of the mopping buckets.

Referring to the structure in more detail, the truck chassis 5 comprises longitudinal or side bars 19 secured to transverse or end bars 21 which are conveniently in the form of angle irons disposed so as to have their angles or webs both horizontal and upright to support the mopping buckets and prevent movement thereof relative to the chassis. Suitably secured at the front and rear of the chassis and extending around the corners thereof are resilient bumpers 22 containing reinforcing strips 24. Centrally disposed with respect to the side bars 19 and secured to each at its ends is a transverse central bar 23 which may be conveniently formed of angle iron having an inverted T cross section. The central bar 23 divides the chassis 5 into two compartments for supporting a pair of mopping buckets. At the four corners inside of the chassis 5, are triangularly shaped platforms 25 provided with suitable apertures through which extend threaded pintles 27 on each of the caster units 13. Each of the threaded pintles 27 are secured to the chassis by a pair of adjusting nuts 29, one below the chassis (not shown) and one above the platform 25. The threaded pintles on the front pair of caster units provide for a preferred means of attachment of the adjustable friction hinges 9 to the chassis 5. The caster units 13 are preferably of the swivel type to provide for maximum maneuverability.

The tubular handle 7 is U-shaped and has its free ends pivotally secured to the chassis 5 through the adjustable friction hinges 9. The adjustable friction hinges are identical in construction and only one will be described. Each comprises a steel plate which is folded over on itself forming a pair of spaced upright plates 31, 33 which terminate in a pair of contiguous bent-over plates 35, 37. Integral with and supported by the spaced upright plates 31, 33 is a tubular member 39 having a pair of spaced adjustable openings 40 and a slot 41 disposed therebetween. The pair of adjustable openings 40 on each of the friction hinges 9 define pivot axes for the tubular handle 7. Connecting the tubular handle 7 to the friction hinges 9 are a pair of connector-pivots each comprising a pivot rod 43 which has integrally united at right angles therewith a stud member 45. Pivot rods 43 are frictionally engaged and rotatably supported in the pair of adjustable openings 40 formed in each of the friction hinges 9 and the stud members 45 operate in the slots 41 as the pivot rods 43 rotate. The diameter of each of the openings 40 on the friction hinges 9 are adjustable to a diameter smaller than the diameter of the pivot rods 43 so as to control the force of frictional engagement on the pivot rods. The adjustment of the diameter of the openings 40 is accomplished by way of adjustable securing means preferably comprising a pair of bolts 47 which extend through a pair of apertures provided in the upright plates 31, 33 on each of the friction hinges 9. The bolts 47 are threadably engaged by nuts 49 and securely retained thereon in a well-known manner, as for example, by lock washers 51. Gusset plates 53 are provided for strengthening between the upright plate 33 and the bent-over plate 37 on each of the friction hinges 9.

In operation, when the bolts 47 and nuts 49 on each of the friction hinges 9 are tightened the diameter of the opening 40 is reduced by the compressive forces placed upon the spaced upright plates 31, 33 which in turn places the tubular member 39 in tension about the pivot rod 43 thereby increasing the force of frictional engagement on the pivot rod. This insures that the tubular handle will remain in any settable position, over the 180° arc in which it is movable. The threaded pintles on the front pair of caster units project through apertures in the pair of contiguous bent-over plates 35, 37 and prevent relative movement therebetween and also between the pair of upright plates 31, 33 of each of the friction hinges. Therefore, the bolts 47 and nuts 49 cause the pair of upright plates to flex or bend under compression which not only increases the force of frictional engagement on the pivot bar 43 but the reactive force developed against the bolts 47 and nuts 49 prevent them from loosening. The tubular handle 7 is thus retained in any position within a 180° arc and also folds flat against the chassis for storage. It requires but a moderate torque applied to the tubular handle to move the same to a new position. One such adjusted position 7a of the tubular handle is shown in Figure 1. In the event the tubular handle should loosen at its pivot due to wear of the engaging parts from continued use, the securing means are adjustable to compensate for this.

The construction and arrangement of the several parts contributes greatly to the low cost of manufacture and assembly of the hand truck. For example, the fact that the handle is tubular effects a savings in material and labor and the especially convenient feature of an adjustable handle which will remain in any desired position is accomplished by the low cost, substantially one-piece friction hinge which is durable and reliable in operation. The integral stud member and pivot rod contribute to the ease of assembling the hand truck, since the substantially one-piece friction hinge can be conveniently formed about the pivot rod, and the free ends of the handle may be slipped over and secured to the stud member to form a unitary sub-assembly. The provision whereby this sub-assembly may be detachably secured to the chassis through the threaded pintles on the front pair of caster units also contributes to the economies obtaining in the manufacture of the hand truck of the present invention.

Ofttimes the small hand truck when used for transporting mopping equipment through office buildings, etc., must be left in the hallways or corridors and the means provided for preventing the handle from falling to the floor eliminates the danger of passersby tripping over the same. Also, this is a convenience in that it eliminates the annoyance of bending over to pick up the handle when it is desired to use the truck. The combination of the adjustable position handle together with the swivel caster units on the chassis adds to the ease of handling mopping equipment in that maneuvering of the assembly through narrow doorways, and other difficultly accessible places is facilitated because the chassis may be spun completely if desired end for end on its own central axis.

It will thus be seen that there has been provided by this invention, a hand truck in which the various objects hereinabove set forth together with many thoroughly practical advantages are successfully achieved. While the preferred embodiment of the invention has been shown and described, it is to be understood that various modifications, changes in size, shape and arrangement of parts may be resorted to without departing from the spirit of the invention or the scope of the appended claims.

What is claimed is:

1. In a hand truck, a rigid chassis comprising a pair of longitudinal side bars, a pair of transverse end bars and a transverse central bar secured together so as to form two compartments adapted to support a pair of mopping buckets, a front and rear pair of swivel caster units having threaded pintles extending through the four corners of the said chassis for rolling the same, a pair of friction hinges secured to said chassis and disposed thereon to form a pair of horizontal friction pivot connections, each said friction hinge comprising a metal plate folded over on itself to form a tubular member and a pair of spaced upright plates supporting said tubular member and having face-opposed relation, said pair of upright plates terminating in a pair of bent-over plates having face-contacting relation, said bent-over plates having aligned apertures, the threaded pintles on said front pair of caster units projecting through said aligned apertures to secure said pair of bent-over plates to said chassis, said tubular member having formed therein a pair of spaced adjustable openings and a slot disposed therebetween, a pair of connector-pivots each comprising a pivot rod frictionally engaged and rotatably supported in each said pair of adjustable openings, each said connector-pivot also comprising a stud member perpendicularly secured to said pivot rod so as to rotate within said slot, a U-shaped tubular handle having a pair of free ends each disposed about and secured to one of said stud members whereby said tubular handle is pivotally mounted on said chassis and movable in an arc to automatically settable positions with respect thereto, and a pair of bolts projecting through each said pair of spaced upright plates, and an adjusting nut secured to each said bolt to urge each said pair of upright plates together to adjust the diameter of each said pair of openings of each said friction hinge so as to control the force of frictional engagement on each said pivot rod whereby to retain said handle in said settable positions.

2. Apparatus for use on a hand truck having a rigid chassis formed with two compartments adapted to support a pair of mopping buckets, comprising a pair of friction hinges secured to said chassis to form a pair of horizontal friction pivot connections, each said friction hinge comprising a metal plate folded over on itself to form a tubular member and a pair of spaced upright plates supporting said tubular member and having face-opposed relation, said pair of upright plates terminating in a pair of bent-over plates having face-contacting relation, said bent-over plates having aligned apertures, means on said chassis extending through said apertures for securing said pair of bent-over plates to said chassis, said tubular member having a slot formed intermediate the ends thereof so as to provide a pair of spaced adjustable openings on opposite sides of said slot, a pair of connector-pivots each comprising a pivot rod frictionally engaged and rotatably supported in one pair of adjustable openings, each of said pair of connector-pivots also comprising a stud member perpendicularly secured to said pivot rod so as to rotate within said slot, a U-shaped tubular handle having a pair of free ends each disposed about and secured to one of said stud members whereby said tubular handle is pivotally mounted and movable in an arc to automatically settable positions with respect to said pair of bent-over plates, and a pair of bolts projecting through each said pair of spaced upright plates, and an adjusting nut secured to each said bolt to urge each said pair of upright plates together to adjust the diameter of each said pair of openings of each said friction hinge so as to control the force of frictional engagement on each said pivot rod whereby to retain said handle in said settable positions.

References Cited in the file of this patent

UNITED STATES PATENTS

| 1,249,489 | Powers | Dec. 11, 1917 |
| 1,819,601 | Hiatt | Aug. 18, 1931 |
| 2,204,691 | Olsen | June 18, 1940 |
| 2,611,149 | Levy | Sept. 23, 1952 |
| 2,622,922 | Schroeder | Dec. 23, 1952 |
| 2,727,753 | Johnson et al. | Dec. 20, 1955 |

FOREIGN PATENTS

| 16,949 | Great Britain | Sept. 20, 1899 |
| | A. D. 1899 | |
| 115,714 | Sweden | Jan. 22, 1946 |

OTHER REFERENCES

Publication—The Colson Corporation, Elyria, Ohio, catalog No. L-292, 1945, page 39.